INVENTORS.
FLAVIUS A. MATHAMEL
NARENDRA M. SHUKLA
BY
Vincent L. Carney
ATTORNEY

INVENTORS.
FLAVIUS A. MATHAMEL
BY NARENDRA M. SHUKLA
Vincent L. Carney
ATTORNEY

INVENTORS.
FLAVIUS A. MATHAMEL
NARENDRA M. SHUKLA
BY Vincent L. Carney
ATTORNEY

INVENTORS.
FLAVIUS A. MATHAMEL
NARENDRA M. SHUKLA
BY Vincent L. Carney
ATTORNEY

INVENTORS.
FLAVIUS A. MATHAMEL
NARENDRA M. SHUKLA
BY Vincent L. Carney
ATTORNEY

United States Patent Office 3,439,117

Patented Apr. 15, 1969

3,439,117

KEYBOARD CONTROLLED MAGNETIC CORE INFORMATION STORAGE AND TRANSFER SYSTEM

Flavius A. Mathamel, Allen Park, and Narendra M. Shukla, Detroit, Mich., assignors to Burroughs Corporation, Detroit, Mich., a corporation of Michigan Filed Sept. 30, 1965, Ser. No. 491,664

Int. Cl. H04l *15/18, 15/12, 15/24*

U.S. Cl. 178—17 2 Claims

ABSTRACT OF THE DISCLOSURE

The disclosure embodies a plurality of individually pivoted key levers connected respectively to a plurality of interposers which are individually movable by the key levers. Each of the interposers has a plurality of projections which are positioned to engage predetermined code bails such that different groups of the code bails are movable by selected ones of the key levers. A plurality of transducer levers are connected to different ones of the code bails whereby each of the transducer levers is movable from a first to a second position whenever the corresponding one of the code bails is moved. Each of the transducer levers carries a permanent magnet and adjacent each magnet there is a transfluxer. Each of the transfluxers has a reset winding, a sense winding, and an output winding.

This invention relates to transducers, and more particularly, relates to transducers for converting mechanical displacement to an electric signal.

It is frequently desirable to convert a mechanical force or a mechanical displacement to an electrical signal that indicates the force or the displacement. In business machines, for example, signals from a keyboard are used to indicate the letter or number selected.

Furthermore, it is often desirable to provide the electrical signal at some predetermined time other than the time of the mechanical force or motion. In a business machine this may be desired when a synchronous computer receives the electrical signals from an asynchronously operated device such as a keyboard. Also, it may be desirable to store the plurality of signals generated serially and then read them into a device in parallel at a predetermined time.

The apparatus for accomplishing these multiple purposes are frequently complicated and expensive because they involve many parts performing different functions. Accordingly, it is an object of this invention to provide an improved transducer for generating an electrical signal in response to a mechanical force or displacement.

It is another object of this invention to provide a transducer which is capable of storing a signal representing a mechanical force or displacement and reading the signal out at a predetermined time.

It is a further object of this invention to provide a transducer which is reliable, durable, and inexpensive.

It is a further object of this invention to provide a transducer which is capable of storing a signal generated by the movement of an object and for providing a continuous readout of this signal from the time the object is removed until the transducer is reset.

In accordance with the above objects, a transducer is provided having a magnetic core with square-loop hysteresis characteristics, which core is fixed in position, and a permanent magnet which is movable with respect to the core. The core is magnetized in one direction by current through a set winding. The permanent magnet magnetizes a portion of the core in the opposite direction whenever it is close to it. A readout winding on the core switches the magnetized portion of the core when it resets the core to generate an output pulse. This signal indicates that the permanent magnet has been moved toward the core at some previous time. The output signal is synchronous with the resetting pulse although the permanent magnet may have been moved toward the core at any previous time.

The core may be in the form of a transfluxor. If the transfluxor has been put in a state of no output by applying a reset pulse to a winding on the large aperture, a permanent magnet brought close to the transfluxor will effectively neutralize the inhibiting action of the large aperture. This enables a continuous readout to be obtained from the transfluxor.

The invention and the above noted other features thereof will be understood more clearly and fully from the following detailed description when considered with reference to the accompanying drawings in which.

Figure 1:
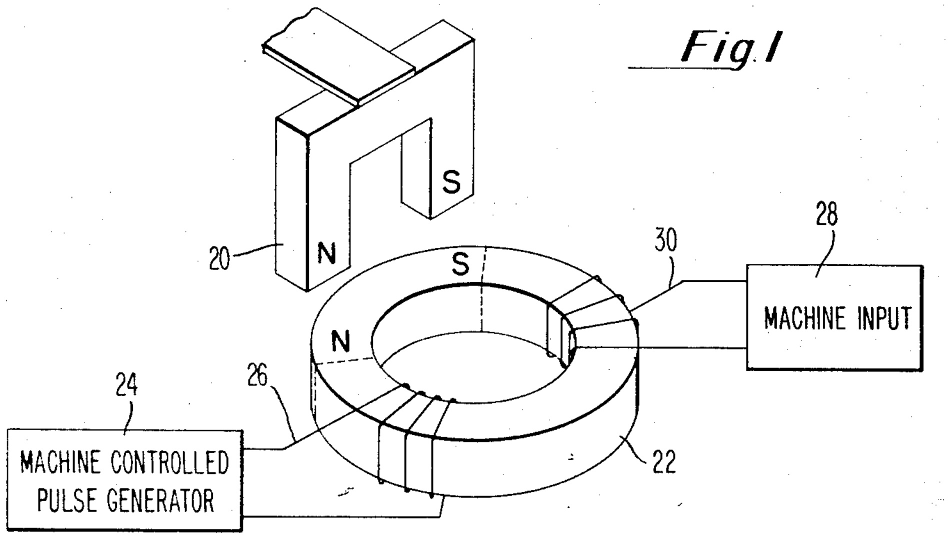
FIG. 1 is a simplified perspective diagram illustrating an embodiment of the invention.

In FIG. 1 a permanent magnet 20 is shown positioned close to a ferromagnetic core 22 which may be composed of ferrite or any other suitable material with square-loop hysteresis characteristics. A pulse generator 24 provides reset pulses to a winding 26 on the core 22 in synchronism with the operation of the machine 28 which receives pulses generated in the output winding 30 on the core 22. The reset pulses magnetize the core 22 in a first direction.

Whenever the permanent magnet 20 is moved close to the edge of the reset magnetic core 22 it magnetizes a portion of this core to the opposite direction from the first direction forming another temporary magnet indicated by the dotted lines on the core 22. When the permanent magnet 20 is again moved away from the core 22 the temporary magnet formed on a portion of the core 22 remains. A pulse from the machine controlled pulse generator 24 resets the core 22 in synchronism with the operation of the machine input 28.

The reset pulses from the machine controlled pulse generator 24 remove the temporary magnet stored on the core 22 generating flux in the core, which flux passes through the output winding 30 generating a voltage. This voltage is applied to the machine input 28 indicating, for example, that a key in a keyboard connected to the permanent magnet 20 has been depressed. It is noted that the output to the machine input 28 is synchronous with the operation of the machine even though the key in the keyboard may have been depressed during some asynchronous time period. The amplitude of the output pulse depends on the strength of the temporary magnet and is, therefore, a function of the proximity of the permanent magnet 20 to the core 22 when the key is depressed.

Figure 2:
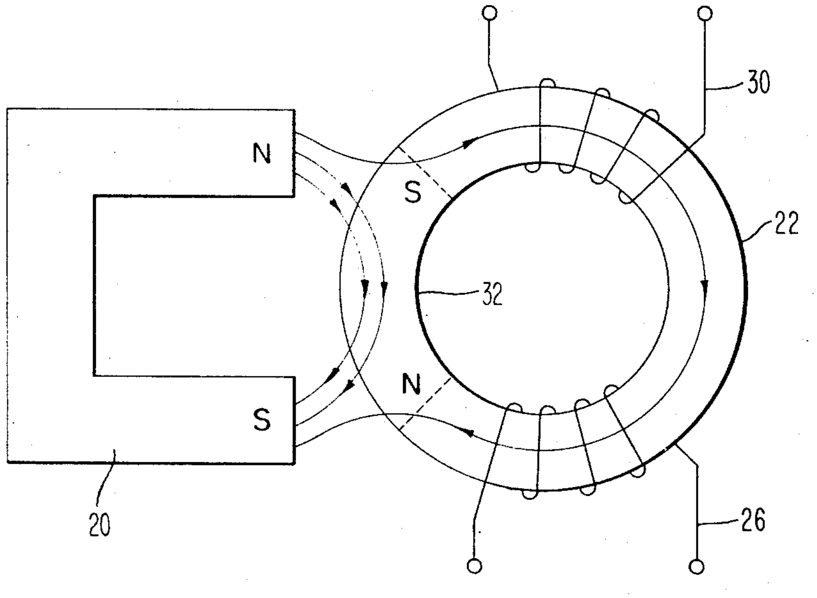
FIG. 2 is a diagrammatic sketch illustrating a principle used in an embodiment of the invention.

In FIG. 2 a diagrammatic sketch is shown illustrating the manner in which the permanent magnet 20 magnetizes a portion of the core 22 to form a temporary magnet 32 along a portion of the core. The flux from one pole of the magnet 20 passes to the other pole through the core 22. The majority of the flux passes through the shorter route through the section 32 switching the domains of the core. A smaller amount of flux passes through the alternate route around the core 22 since it has a higher reluctance due to its greater length. The flux through the remainder of the core does not have a sufficient density to result in a flux intensity sufficient to switch the domains in that portion of the core. In FIG. 2 it is possible to have the larger sector switched by the magnet thereby utilizing a larger portion of the core which provides a larger output.

A pulse applied to the winding 26 is capable of switching the section 32 of the core 22 from one state to the other. This switching of the domains results in an output pulse on winding 30. It is to be noted that if the reset pulse applied to the winding 26 does not have a great enough amplitude, no voltage is generated in the output winding. Also, a pulse supplied to winding 26 after the temporary permanent magnet has been removed by a prior reset pulse does not generate an output pulse in the winding 30 because the core 22 is entirely saturated in the same direction at this time. In this embodiment of the invention no pulses are applied of the opposite polarity to set the entire core 22. Only a portion of the core 22 is set by the permanent magnet 20.

Figure 3:
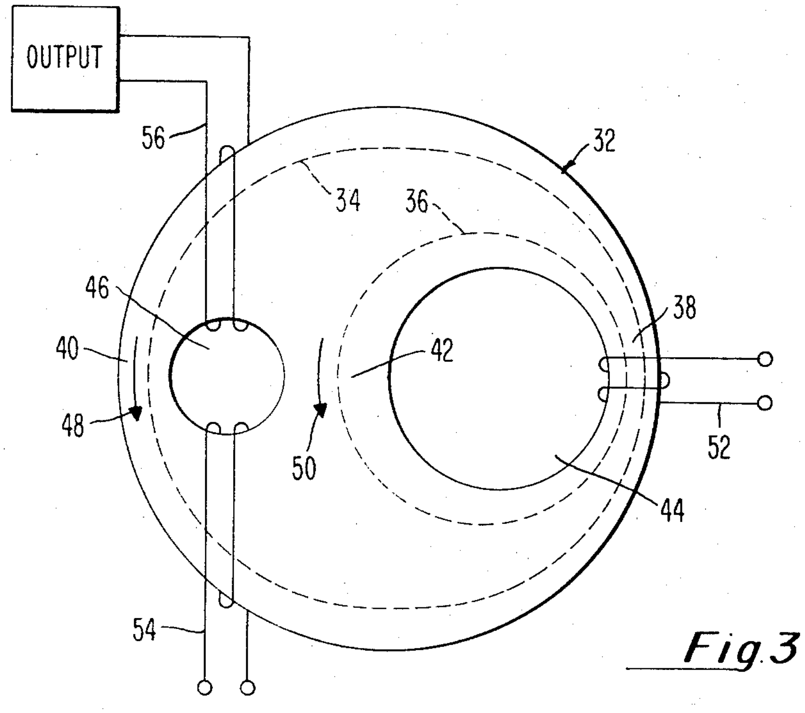
FIG. 3 is a diagrammatic sketch illustrating one stage in an embodiment of the invention using multiapertured cores.

In FIG. 3 a diagrammatic sketch of a multiapertured core is shown illustrating one stage in the operation of another embodiment of the invention. This embodiment of the invention is capable of providing a continuous readout from the core after it has been set once by a permanent magnet. This embodiment enables a core to be set once and to remain set for several cycles of the synchronous machine to which a readout is being applied. It may have special uses such as in controlling repeated readouts from the same keyboard. For example, it could control the continuous addition or multiplication of a series of numbers to be punched into the keyboard in succession during several cycles of operation of the computer.

The multiapertured core 32 is a transfluxor of the type described in the U.S. patent to Rajchman et al., No. 2,803,812. However, when used as part of a transducer, as it is in this embodiment, fewer windings are needed since a permanent magnet is used to set one leg of the transfluxor. In FIG. 3 a transfluxor 32 is shown having two closed flux loops shown by the dotted lines 34 and 36. Both of these loops pass through the leg 38 of the core 32, which leg has a cross-sectional area equal to the combined cross-sectional areas of the other two legs 40 and 42. The flux loop 36 passes around the larger aperture 44, through the leg 38 and the leg 42 of the core 32. The other flux loop 34 passes around both the larger aperture 44 and the smaller aperture 46 through the leg 38 and the leg 40. The direction of the flux through the leg 40 is shown by the arrow 48 and the direction of the flux through the leg 42 is shown by the arrow 50.

This flux pattern is obtained by applying a current pulse through the winding 52 which is wound through the large aperture 44 and around the large leg 38. It results in flux flowing in the same direction through the two smaller legs 40 and 42 and saturating them. Because the legs 40 and 42 are both saturated in the same direction, an input pulse applied to winding 54 cannot find a continuous flux path around the aperture 46. Accordingly, the pulse does not switch the magnetic material around the small aperture 46 from one direction to the other to induce an output voltage pulse in the output winding 56.

Figure 4:
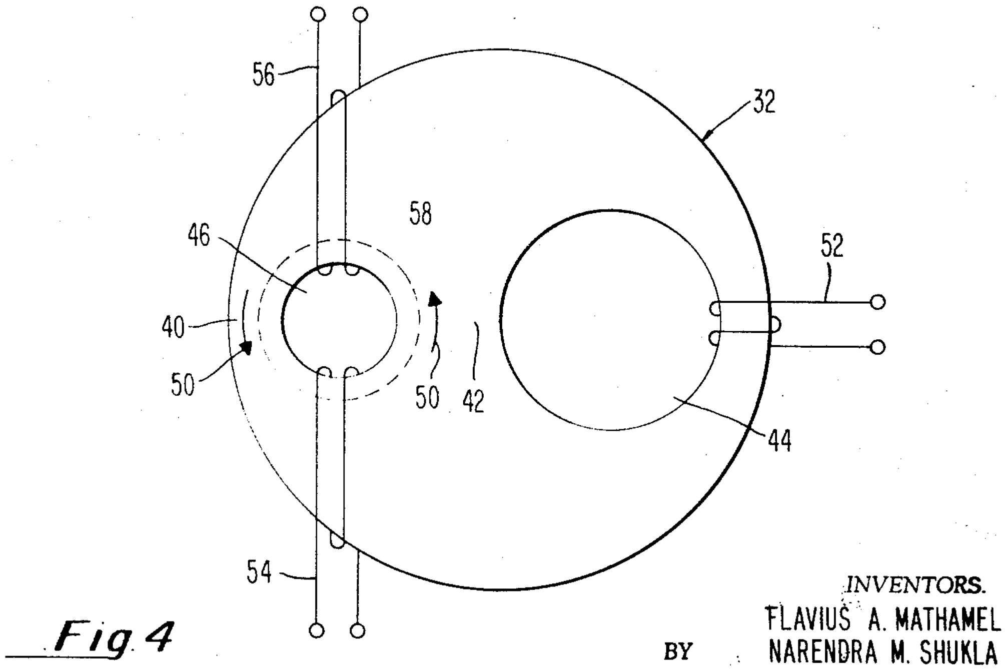
FIG. 4 is a diagrammatic sketch illustrating a second stage in an embodiment of the invention using multiapertured cores.

In FIG. 4 the core 32 is shown with one flux path 58 around the small aperture 46 forming a continuous flux path. To obtain this state the flux in one of the two smaller legs 40 and 42 must be reversed by some external source. In the usual operation of a transfluxer, the flux in one of the legs is switched by a separate winding. However in this embodiment of the invention, the flux is switched by bringing a permanent magnet close to one of the legs. In FIG. 4 the flux through the leg 42 is shown to be switched to the opposite state by the arrow 50.

When the flux pattern is as shown in FIG. 4, a continuous series of output pulses is obtained on output winding 56 in response to a continuous series of A.C. input pulses applied to the winding 54. Since a continuous flux path is formed around the aperture 46, the magnetic material around this aperture is switched from one state to the other by the A.C. input pulses applied to the winding 54. An output voltage is generated in the winding 56 each time the direction of the flux around the aperture 46 is changed. In this manner it can be determined that the permanent magnet has been brought close to the leg 42 of the core at some previous time. The readout is obtained at each cycle of the computer, showing that the proper key was depressed, until another large pulse is applied to the winding 52 to reset the core to the state shown in FIG. 3, in which state no output pulses are provided by the winding 56.

Figure 5:
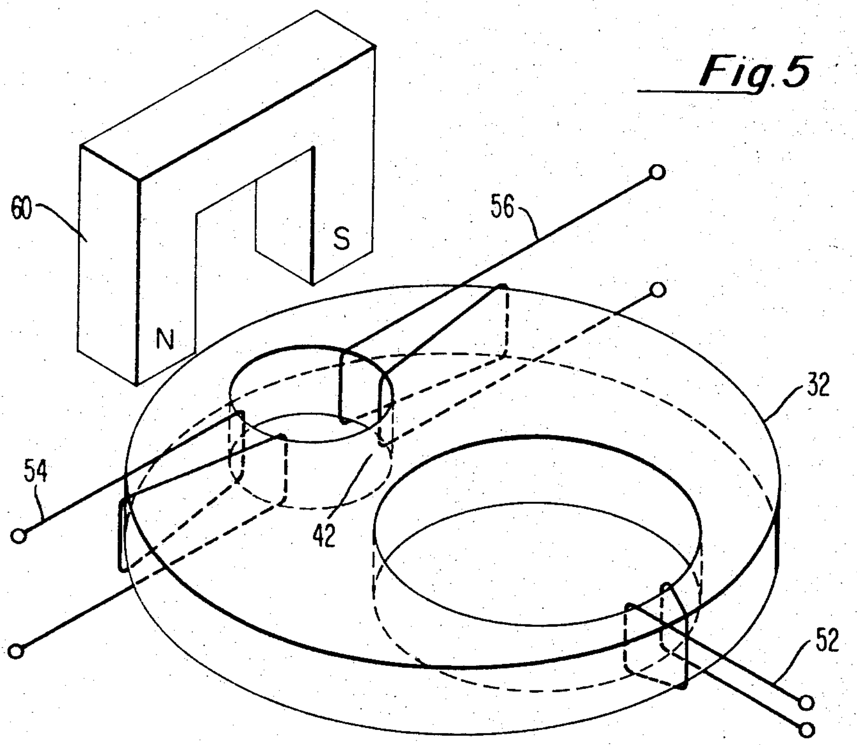
FIG. 5 is a simplified perspective drawing illustrating an embodiment of the invention using multiapertured cores.

In FIG. 5 a perspective drawing is shown of a multiapertured core 32 illustrating the manner in which a permanent magnet 60 is positioned with respect to one of the smaller legs 42 of the core to switch the direction of flux in that leg. When the magnet is brought into this position, the core 32 begins to provide output pulses from the winding 56 each time an input pulse is applied to the winding 54. The pulses continue, even though the magnet 60 is removed, until a reset pulse is applied to the winding 52.

Figure 6:
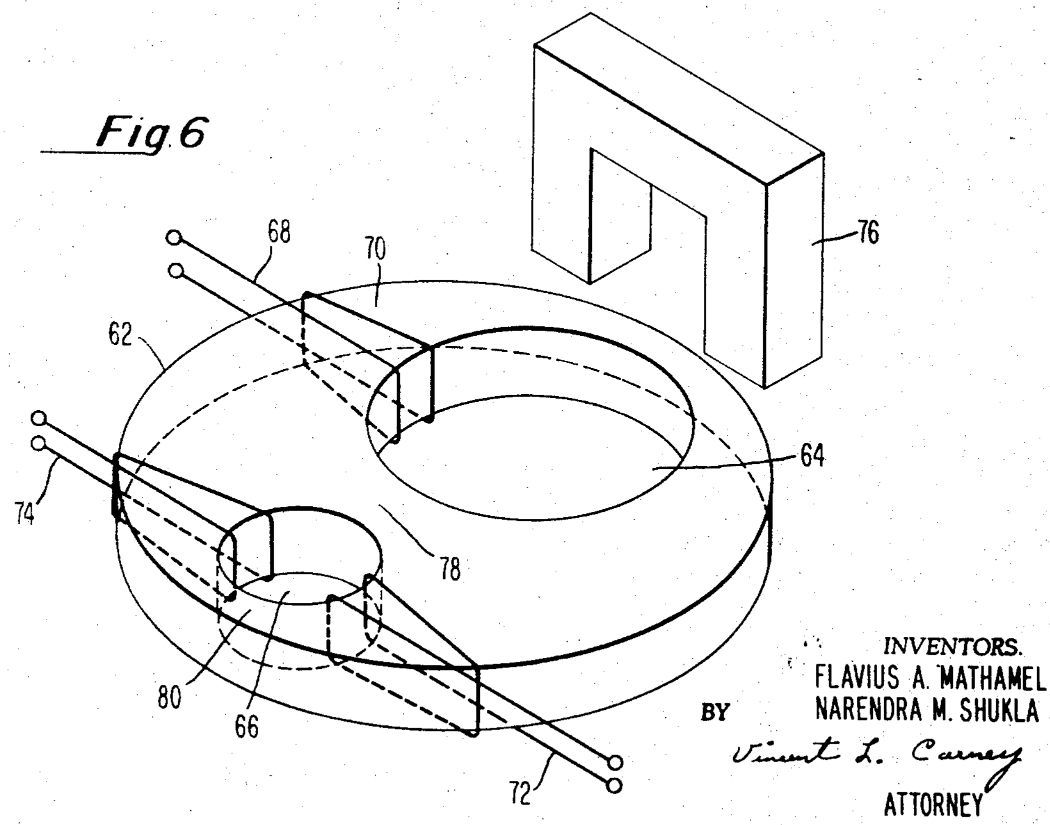
FIG. 6 is a smplified perspective drawing illustrating another embodiment of the invention using multiapertured cores.

In FIG. 6 a perspective drawing is shown of another embodiment of the invention using a multiapertured core 62 having a large aperture 64 and a small aperture 66. A reset winding 68 is wound around the larger leg 70 through the large aperture 64. An input winding 72 and an output winding 74 are wound through the small aperture 66.

The embodiment shown in FIG. 6 differs from that shown in FIG. 5 in that a permanent magnet 76 is positioned to switch the flux in the larger of the three legs 70 of the core 62 rather than switching the flux in either of the smaller legs 78 or 80. Because of this difference in the embodiment, an added advantage is obtained in that no output pulse is obtainable from the transducer until after the magnet 76 has been removed from its position close to the core 62. In contrast to this, the embodiment shown in FIG. 5 provided an output pulse from the winding 56 as soon as the magnet 60 was brought close to one of the smaller legs of the core 32.

Figure 7:
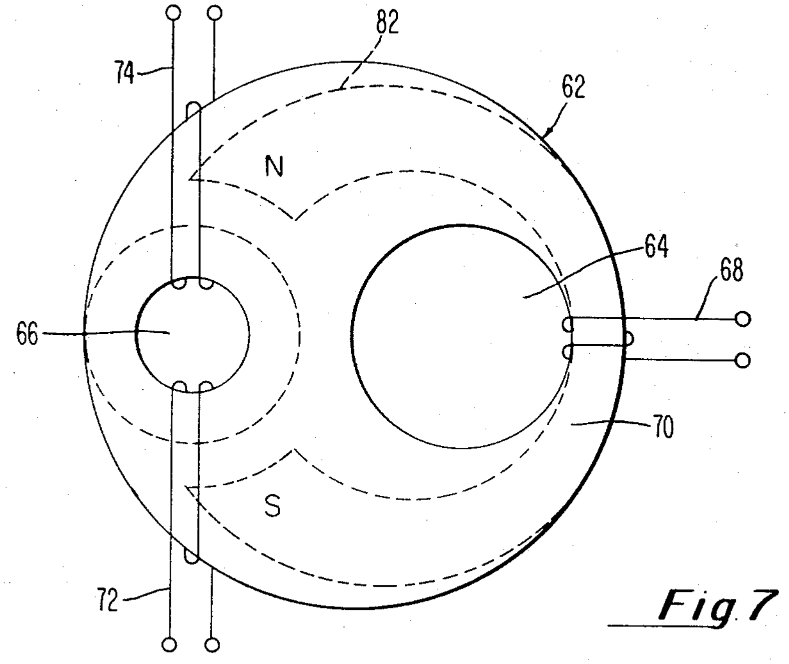
FIG. 7 is a diagrammatic sketch illustrating a stage in the operation of the same embodiment of the invention as is illustrated in FIG. 6.

In FIG. 7 a diagrammatic sketch is shown of the embodiment of FIG. 6 illustrating the flux pattern in the core after a reset pulse has been applied to the winding 68 but before the permanent magnet 76 has been brought close to the larger leg 70 of the core 62. The dotted lines 82 illustrate a permanent magnet which may be considered as part of the transducer after a reset pulse has been applied to the winding 68. This merely indicates that the magnetic material in the core has been switched to form a structure analogous to a horseshoe magnet around a large aperture 64 with its poles impinging upon the area around the small aperture 66.

The flux flowing between the poles of the magnet 82 inhibits the magnetic material around the small aperture 66 so that it does not switch from one state to the other when an input pulse is applied to the input winding 72. Consequently, no output is obtainable from the output winding 74. It should be noted that this is merely another manner of explaining the operation of a transfluxor. This explanation is chosen so as to illustrate the embodiment of FIG. 6 most clearly.

The inhibiting effect of a permanent magnet on a core is explained in the co-pending United States patent application to Flavius A. Mathamel, Ser. No. 433,359, entitled "Transducer." That application was filed Feb. 17, 1965, and is assigned to the same assignee as the instant application. In that application it is explained that the flux from a permanent magnet which saturates a portion of a ferromagnetic core inhibits the ferromagnetic core from switching states by preventing flux flow through the saturated portion of the ferromagnetic core. This saturated portion heuristically is thought of as an air gap.

Figure 8:
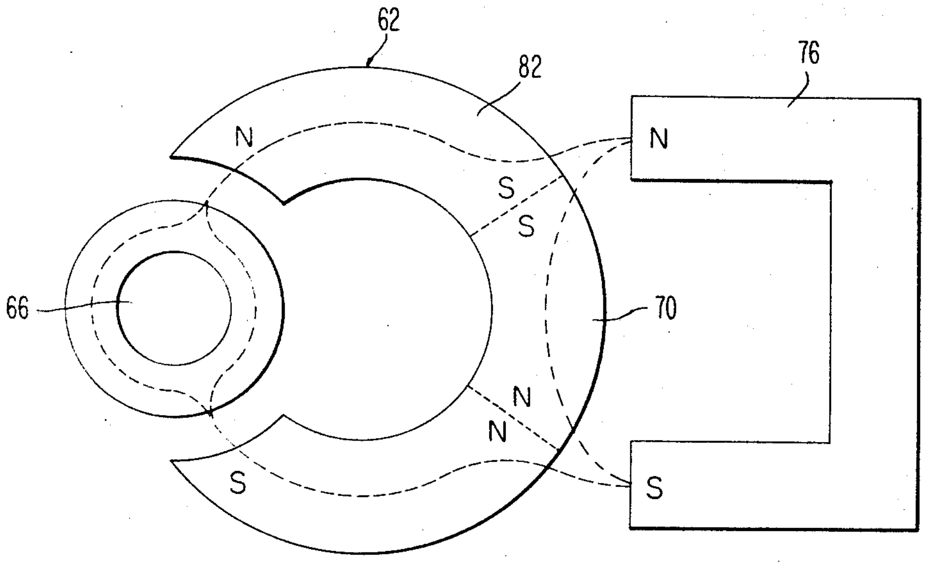
FIG. 8 is a diagrammatic sketch illustrating another stage in the operation of the embodiment of the invention illustrated in FIG. 6.

In FIG. 8 a diagrammatic sketch is shown of the multi-apertured core in a second stage of the embodiment of the invention shown in FIG. 6. In this stage the permanent magnet 76 is brought close to the wide leg 70 of the core 62. The area around the small aperture 66 is illustrated as a small core in this drawing. The magnet 82 of FIG. 7 is shown inhibiting this core.

The permanent magnet 76 is brought close to the wide leg 70 of the core 62 with its poles having the same orientation as the flux in the wide leg 70 so that the flux from the permanent magnet 76 reinforces the flux around the large aperture of the core 62 in its inhibiting action of the material around the small aperture 66. In FIG. 8 it is shown that two small magnetic areas are formed under the poles of the permanent magnet 76 which areas have an orientation the reverse of that of the adjacent pole. These magnetized areas reinforce the flux flow from the poles of the permanent magnet 76 through the core 62. It is clear that as long as the permanent magnet 76 is in this position no output is provided from the transducer. Therefore, there is no indication that the key of a keyboard has been depressed as long as the key is held in its depressed position.

Figure 9:
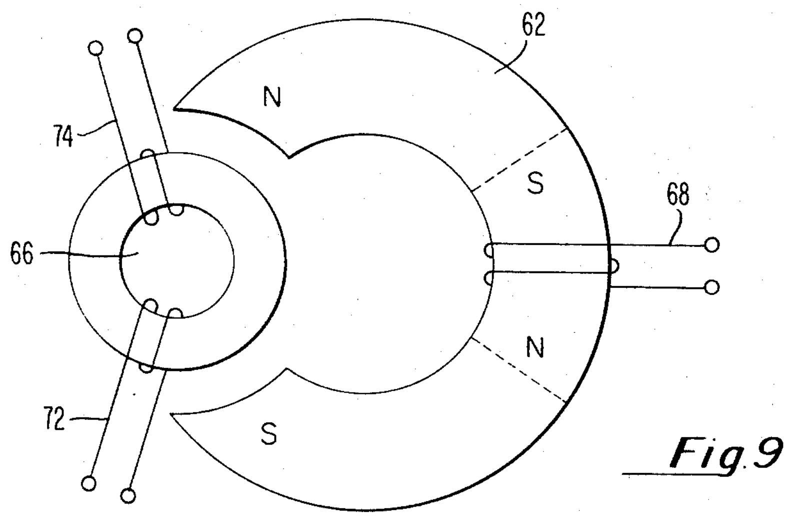
FIG. 9 is a diagrammatic sketch illustrating still another stage in the operation of the embodiment of the invention illustrated in FIG. 6.

In FIG. 9 a diagrammatic sketch is shown of a multi-apertured core illustrating a third stage in the operation of the embodiment of FIG. 6. In this third stage the permanent magnet has been withdrawn from the core 62. When the permanent magnet 76 is withdrawn from the core, it leaves behind it a section of magnetic material which has the opposite orientation as the magnetic material around the large aperture of the core 62. This section of material operates as an air gap on this magnetic material, interrupting the flow of flux through the magnetic material around the small aperture 66 in the manner explained in the above-identified application of Flavius A. Mathamel.

Since the flux no longer flows through the magnetic material around the core 66, this material can be switched from one state to the other by A.C. current pulses applied to the winding 72 resulting in output voltage pulses in the winding 74. This switching may continue until a reset pulse is applied to the reset winding 68. It will be noted that this embodiment of the invention indicates when the magnet is withdrawn from the core rather than when the magnet is brought close to the core as was the case in the previous embodiments.

Figure 10:
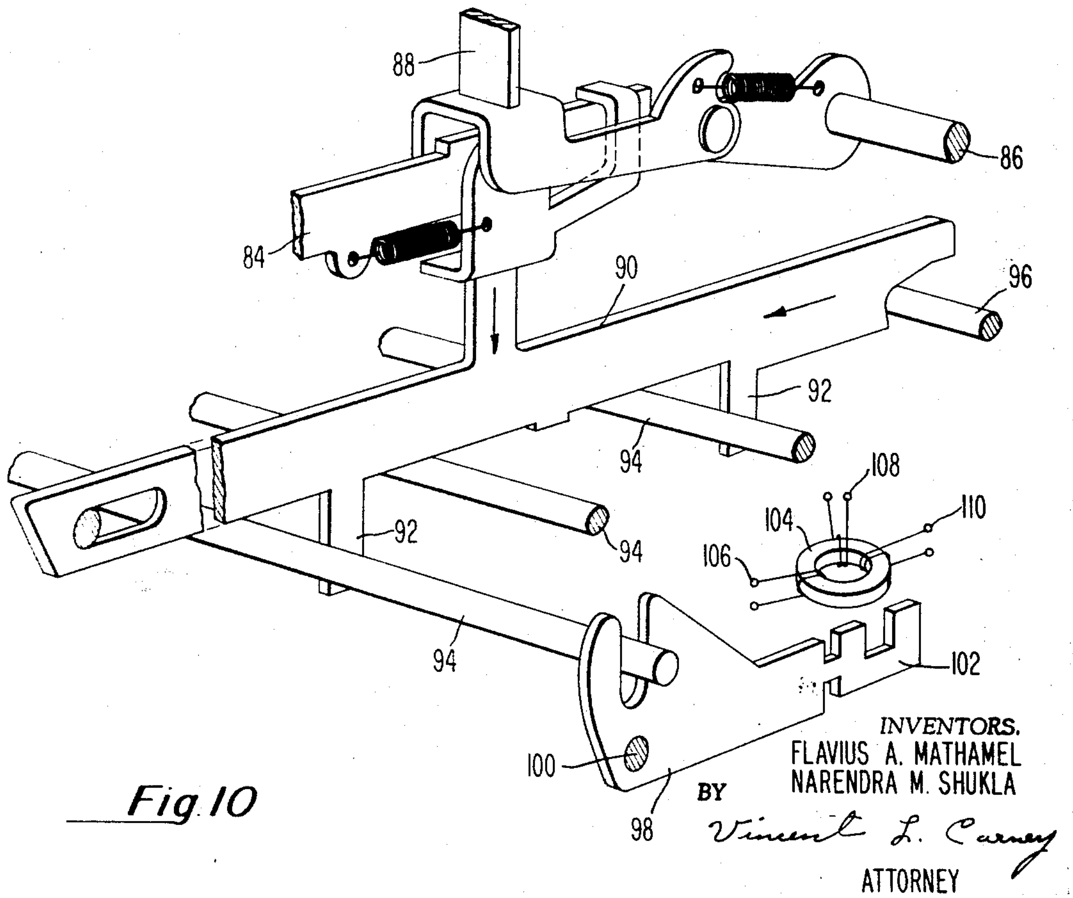
FIG. 10 is a simplified perspective drawing of a portion of a keyboard using an embodiment of the invention.

In FIG. 10 a partial perspective drawing is shown of a keyboard mechanism in which the embodiments of this invention have utility. In this keyboard mechanism key lever 84 is rotated about a pin 86 whenever a key button 88 is depressed. The key lever 84 depresses an elongated interposer 90 which has a plurality of projections 92 spaced across its bottom side at predetermined coded intervals. When the interposer is depressed, these projections move into a linking arrangement behind a plurality of elongated code bails 94 which have their longitudinal axes perpendicular to the longitudinal axis of the interposer. The projections on the interposer, in this manner, select predetermined ones of the code bail 94 and move them forward as the interposer is moved by a drive bail 96. Each of the code bails 94 engages a code lever 98 to rotate it about a pin 100.

Each key button of a keyboard selects a predetermined plurality of code levers to be rotated by its selected code bails. Each of the code levers moves a permanent magnet 102 into juxtaposition with a core 104. The cores are each linked with a drive winding 106 which resets the cores at selected intervals in synchronism with the output mechanism of the keyboard. This may be synchronized in turn with a computer. Similarly, input windings 108 receive clock pulses in synchronism with the output of the keyboard to provide output pulses on the output winding 110 whenever a permanent magnet 102 has been moved close to its corresponding core 104 between clock pulses of the input unit.

It can be seen that this invention provides a simple, durable, reliable, and inexpensive transducer for converting mechanical motion or displacement to electrical signals. The reliability and economy of the transducer are due to its reliance on magnetic elements. Furthermore, this transducer has many other desirable characteristics of magnetic transducers such as the ability to provide electrical output signals which have a high amplitude and the narrow time-width. These outputs are especially desirable as outputs from keyboards which are to be applied to data processing equipment.

Furthermore, this transducer has the ability to store signals generated by displacement or force until they are read out by a timing pulse which may be synchronized with the output data processing equipment. This provides the capability of adjusting an asynchronous device to a synchronous device as well as the capability of converting serial data to parallel data. Furthermore, it is possible to obtain an interlocking mechanism in which an output is not obtained until after the moving element has been withdrawn rather than generating a signal as soon as the moving element is initially moved.

What is claimed is:

1. A keyboard which may be operated asynchronously and which may apply output signals to a synchronous machine, comprising:

a plurality of individually pivoted key levers;

a plurality of interposers each having a plurality of spaced apart projections and connected to a corresponding one of said key levers;

a plurality of code bails positioned for engagement by projections on said interposers, whereby a predetermined different group of said code bails is selected each time a different key lever is depressed;

a plurality of transducer levers each connected to a different code bail for movement from a first position to a second position whenever the corresponding one of said code bails is moved;

a plurality of permanent magnets each being connected to a corresponding one of said transducer levers;

a plurality of transfluxers each positioned adjacent to a corresponding one of said permanent magnets;

each of said transfluxers having a reset winding adapted to be pulsed once for each machine cycle of said synchronous machine;

each of said transfluxers having a sense winding adapted to read out a stored signal in said transfluxer at a predetermined time during each machine cycle of said synchronous machine; and each of said transfluxers having an output winding means for providing an output signal to said synchronous machine whenever a current pulse is received by a corresponding sensing winding after a corresponding permanent magnet has been moved adjacent to said transfluxer and before a reset pulse has been applied to said reset winding.

2. A keyboard which may be operated asynchronously and which may apply output signals to a synchronous machine, comprising:

a plurality of key buttons adapted to be depressed by an operator;

a plurality of key levers each adapted to be pivoted about a pin and each being connected to a corresponding one of said key buttons;

a plurality of interposers each having a plurality of projections along one side at selected intervals and each being mechanically connected to a corresponding one of said key levers;

a plurality of code bails perpendicular to said plurality of interposers and positioned so that predetermined pairs of said code bails will be intercepted by said projections on said interposers, whereby a predetermined different group of said code bails is selected each time a different key button is depressed;

a plurality of transducer levers each being mechanically connected to a different code bail so as to be moved from a first position to a second position whenever the corresponding one of said code bails is moved;

a plurality of permanent magnets each being connected to a corresponding one of said transducer levers;

a plurality of transfluxors each positioned adjacent to a corresponding one of said permanent magnets;

each of said transfluxors having a reset winding adapted to be pulsed ones for each machine cycle of said synchronous machine;

each of said transfluxors having a sensing winding adapted to read out the stored signal in said transfluxor at a predetermined time during each machine cycle of said synchronous machine; and each of said transfluxors having an output winding means for providing an output signal to said synchronous machine whenever a current pulse is received by a corresponding sensing winding after a corresponding permanent magnet has been moved so as to be adjacent to said transfluxor and before a reset pulse has been applied to said reset winding.

References Cited

UNITED STATES PATENTS

| | | | |
|---|---|---|---|
| 2,860,325 | 11/1958 | Welsh et al. | 178—17.5 |
| 2,939,758 | 6/1960 | Crosman. | |
| 3,197,747 | 7/1965 | Kramer. | |

OTHER REFERENCES

IBM Technical Disclosure Bulletin, vol. 4 No. 4, September 1961, entitled "Transducer Device," by R. S. Hill.

THOMAS A. ROBINSON, *Primary Examiner.*

U.S. Cl. X.R.

340—174, 365